B. TUKEY.
Fruit-Gatherer.
No. 35,717. Patented June 24, 1862.
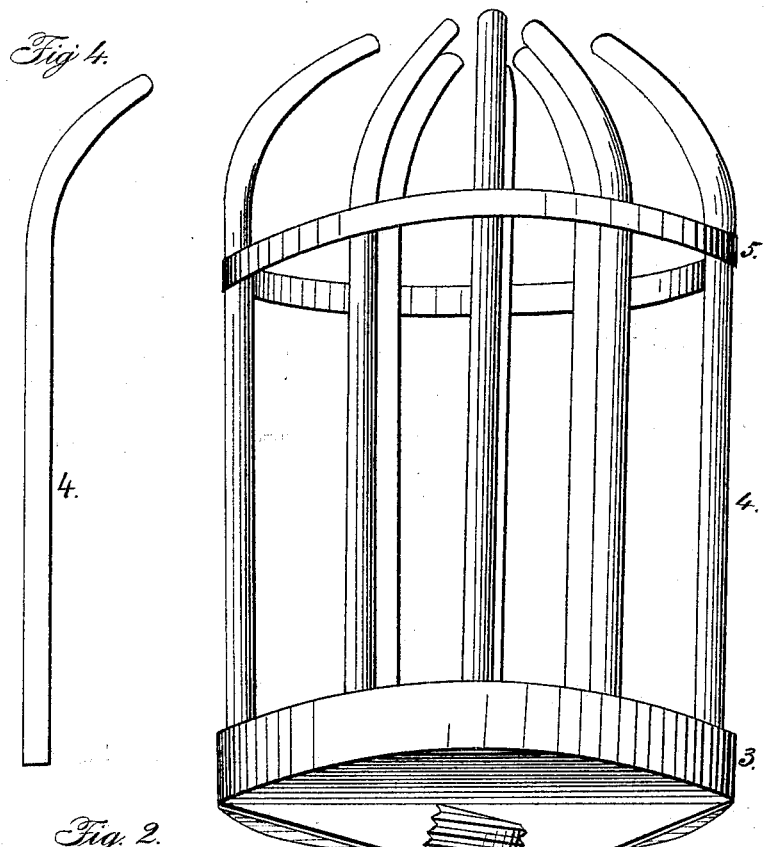
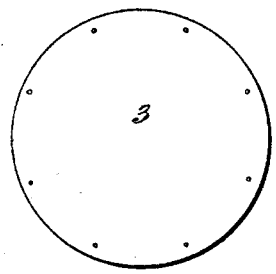
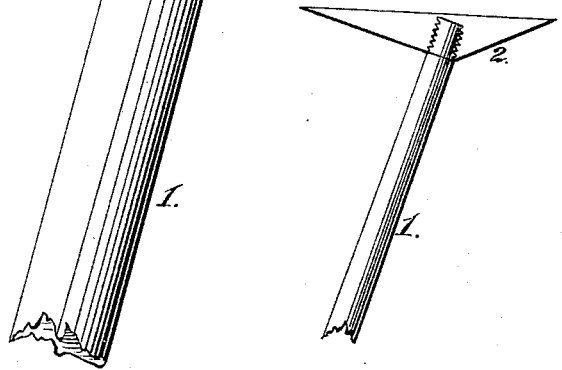
Witnesses:
J. O. Thompson
A. W. Nye
Inventor:
Benjamin Tukey

UNITED STATES PATENT OFFICE.

BENJAMIN TUKEY, OF FAIRFIELD, MAINE.

IMPROVED FRUIT-GATHERER.

Specification forming part of Letters Patent No. 35,717, dated June 24, 1862.

*To all whom it may concern:*

Be it known that I, BENJAMIN TUKEY, of Fairfield, county of Somerset, and State of Maine, have invented a new and improved mode of gathering fruit from fruit-trees of all kinds, such as apples, pears, peaches, quinces, and all other kinds, whether large or small; and I do hereby declare that the following is a full and exact description thereof, reference being had to the accompanying drawings and the figures of reference marked thereon.

The nature of my invention consists in providing a sort of cage, open at the top to allow the ingress of the fruit, and provided with a handle of sufficient length to allow the operator, while standing upon the ground, to gather the fruit. In this manner the fruit is gathered more expeditiously than can be done by hand, and with less danger of bruising.

To enable others skilled in the art to make and use my invention, I will proceed to describe its construction and operation.

The bottom, marked 3 in Figures 1 and 2, is of wood or other material, circular in form, from four to twelve inches in diameter and seven-eighths inch in thickness. Across this, on the under side, is secured a cleat or cross-piece, of wood or other material, of which 2, Fig. 1, is a perspective view, and 2, Fig. 3, is a longitudinal section. This cleat is in the form of a scalene triangle, the longest side being equal to the diameter of the disk or bottom, the two other sides differing from each other about one inch. The altitude of the triangle is about one and one-fourth inch and the thickness about one and a half inch. Into this cleat is screwed the handle at right angles with the longer of the two lower sides and near the angle formed by that and the shortest side, in the manner shown in Figs. 1 and 3 of the accompanying drawings. The handle is of wood or any other material, from seven-eighths inch to one and a half inch in diameter, and of any required length. Into the upper side of the disk or bottom are secured from eight to sixteen or more fingers or standards, made of wood or other material, from one-sixteenth to three-eighths inch in diameter and from six to twelve inches long, curved near the upper extremity, as represented by Figs. 1 and 4 of the accompanying drawings. Around these fingers is secured, just below the curve, or at any convenient point of their altitude, a cutter, made of tin, steel, or other material, secured to the fingers by means of tacks, nails, screws, or other fastenings. The cutter may be used upon the inside or outside of the fingers, or entirely dispensed with, at the pleasure of the operator.

In using this fruit-picker the instrument is passed up under the fruit, which is allowed to enter the opening between the fingers at the top, when a slight motion of the hand cuts or breaks off the stem, allowing the fruit to remain within the instrument.

What I claim as my invention, and desire to secure by Letters Patent, is—

The method of gathering fruit described above, without danger of bruising the fruit and without ascending the trees, using for the purpose the instrument hereinabove described or any other substantially the same.

BENJAMIN TUKEY.

Witnesses:
J. O. THOMPSON,
F. E. McFADDEN.